United States Patent [19]

Comerford et al.

[11] Patent Number: 5,032,708
[45] Date of Patent: Jul. 16, 1991

[54] WRITE-ONCE-READ-ONCE BATTERYLESS AUTHENTICATION TOKEN

[75] Inventors: Liam D. Comerford, Carmel, N.Y.; Vernon E. Shrauger, Somerville, Mass.

[73] Assignee: International Business Machines Corp., Armonk, N.Y.

[21] Appl. No.: 391,912

[22] Filed: Aug. 10, 1989

[51] Int. Cl.⁵ .............................................. G06K 19/06
[52] U.S. Cl. .................................... 235/492; 235/487; 235/441; 365/96
[58] Field of Search ............... 235/487, 492, 380, 381, 235/382, 441; 365/96

[56] References Cited

U.S. PATENT DOCUMENTS 3,544,769 12/1970 Hedin ................................. 235/492
4,734,885 3/1988 Luich ................................. 365/96
4,773,046 9/1988 Akaogi et al. ........................ 365/96

Primary Examiner—Harold Pitts
Attorney, Agent, or Firm—Whitham & Marhoefer

[57] ABSTRACT

A write-once-read-once batteryless token stores access data using fuses similar to those found in programmable fuse link devices. These fuses indicate the status of a particular bit in either of two memory arrays. An intact fuse indicates that a bit is a logical zero, and a blown fuse indicates that a bit is a logical one. The process of reading a particular bit in either array causes the destruction of the corresponding memory cells in both arrays before the data from the selected cell becomes available to the reading device. The memory bit cells are destroyed by blowing the bit fuse during the read cycle.

26 Claims, 4 Drawing Sheets

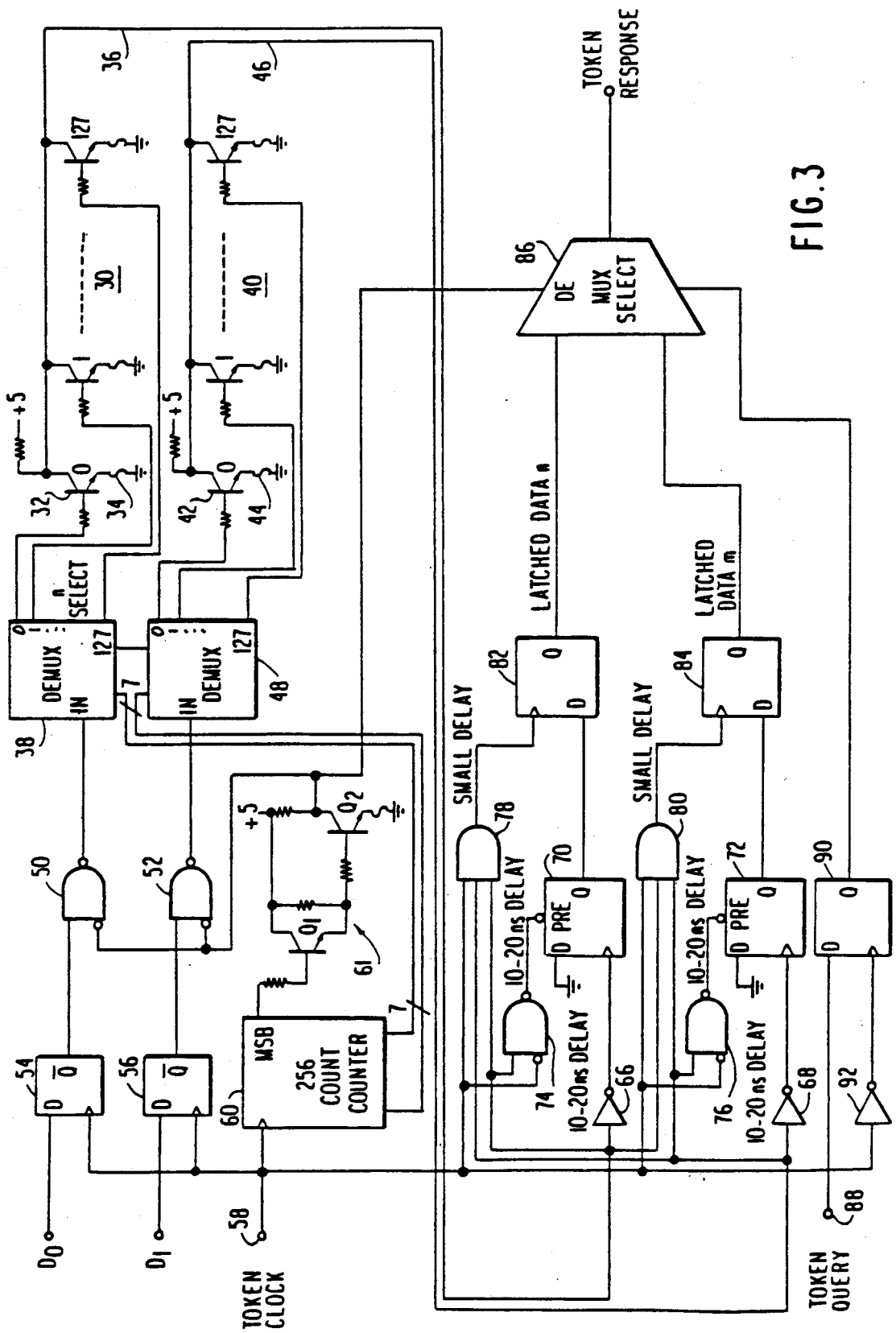

WRITE-ONCE-READ-ONCE BATTERYLESS AUTHENTICATION TOKEN

DESCRIPTION

BACKGROUND OF THE INVENTION

1. Field of the Invention

The present invention generally relates to a physically secure forgery-resistant authorization device in the form of a token or key card. The token or key card represents authorization to perform some action or transaction such as providing access to information or a physical place. More particularly, this invention relates to a write-once-read-once batteryless authentication token having particular application in hardware-based security systems.

2. Description of the Prior Art

A security system is described in an article by Steve R. White and Liam Comerford entitled "ABYSS A Trusted Architecture for Software Protection", pp. 38-51, Proceedings of the IEEE Computer Society Conference on Security and Privacy, Oakland, Calif., Apr. 27-29, 1987. In that system, a use-once authentication mechanism, called a token, solves the problem of providing authorization to a computer to execute a piece of protected software without requiring the user to have two way communication with the software source. The system has many security applications, but in particular, enforcement of terms and conditions of the sale of software is mentioned.

The token is a small hardware device which may be characterized as analogous to a theater ticket. It is examined in an electronic transaction to ascertain whether or not it is valid and is concomitantly invalidated. The fact that invalidation is inherent in the examination process makes it a read-once device. The way that the token is examined to prove validity is straightforward. The token contains two forms of data. One form of the data is read and compared with what the token is expected to contain. If it matches, the token is valid. Note that the other form of the data in the token is an encrypted copy of the first form. The examining hardware has a cryptographic key to decode the second form of data for purposes of making the comparison with the first form of the data.

What makes the token a unique and viable authentication agent is that its architecture effectively prevents its forgery. That is, even if a query which requests data from the token and the token response are recorded, this information is not useful in an attempt to correctly answer a second query.

The token examination process consists of a random series of one-bit queries to the token and responses from the token during which a subset of the token's data is requested and revealed. For each bit of data which is revealed, a bit of data is destroyed. By the end of this process, half of the data contained in the token has been revealed and half has been destroyed, rendering it useless for further operations. To simulate this action, i.e., forge a token, one must be prepared to respond correctly to any sequence of queries. This implies that one must know the entire token contents. In general, at most half of any token's data is examined. This amount is sufficient to establish that the token is valid, but not enough to afford a prospective forger the information required to simulate a valid token in the face of any sequence of queries which differ in any way from the first examination.

FIG. 1 shows the logical and physical connection of a token 12 to a validating processor 10. To test for a valid token, the validating processor generates a random bit sequence, or query. It places the first bit on the token's query line 14 and pulses the token's clock line 16. The token places the content of the selected register on its output line 18. The processor 10 reads this value, stores it, and repeats the process with the next bit of the query. After completing the query/response sequence, the processor compares the response sequence with the expected response sequence to the given query. This expected response sequence is found by simulating the token query process using data supplied to the validating processor by other, typically cryptographic, channels. If they match, the token is considered valid.

FIGS. 2A and 2B illustrate both the simplified token architecture and a sample portion of the token validation sequence. The token's data is stored in two n-bit shift registers 20 and 22. These shift registers feed into a multiplexer 23 which routes the data in response to the query line 24 from the selected register to the response line 28. Upon each register shift, each register shifts out one bit of data and shifts in a zero. This effectively erases the token after n-queries and renders the token useless. In the sample sequence shown, the procedure begins with "what's currently in the UP register?", and the response returned is "zero". The data in the DOWN register 22 is also shifted out, as indicated in FIG. 2B, but it is not provided to any external terminal of the device. This procedure is repeated n times with n randomly selected queries, during which n bits of data are revealed and n bits discarded.

In the current ABYSS security system, the tokens which allow access to the system are operated under battery power which gives the tokens a limited life and added cost of manufacture.

SUMMARY OF THE INVENTION

It is therefore an object of the present invention to provide a token which is inexpensive to manufacture and has an unlimited shelf life.

It is another object of the invention to provide a batteryless token which conforms to the current battery powered token interface architecture and is less susceptible to accidental clocking, making it more reliable.

According to the invention, a write-once-read-once batteryless token stores the necessary access data using fuses similar to those found in programmable fuse link devices. These fuses indicate the status of a particular bit in either of two memory arrays. In the convention adopted in the preferred embodiment of the invention, an intact fuse indicates that a bit is a logical zero, and a blown fuse indicates that a bit is a logical one; however, it should be clear to one skilled in the art that a token can be built in which the logical sense of the fuse links are reversed without departing from the spirit of this invention. This design deviates from the prior tokens such as the form shown in FIGS. 2A and 2B in that the memory storage does not require sustaining power to be supplied.

Although it is possible to implement the prior token in a memory array, in the case of the subject invention, the process of reading a particular bit in either array causes not merely the erasure of data, but the destruction of the memory cell before the data becomes valid to the reading device. The data in the memory bit cells is destroyed by blowing the bit fuse during the read cycle.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a logic and circuit diagram of the write-once-read-once batteryless token according to a preferred embodiment of the invention.

DETAILED DESCRIPTION OF A PREFERRED EMBODIMENT OF THE INVENTION

Figure 1:
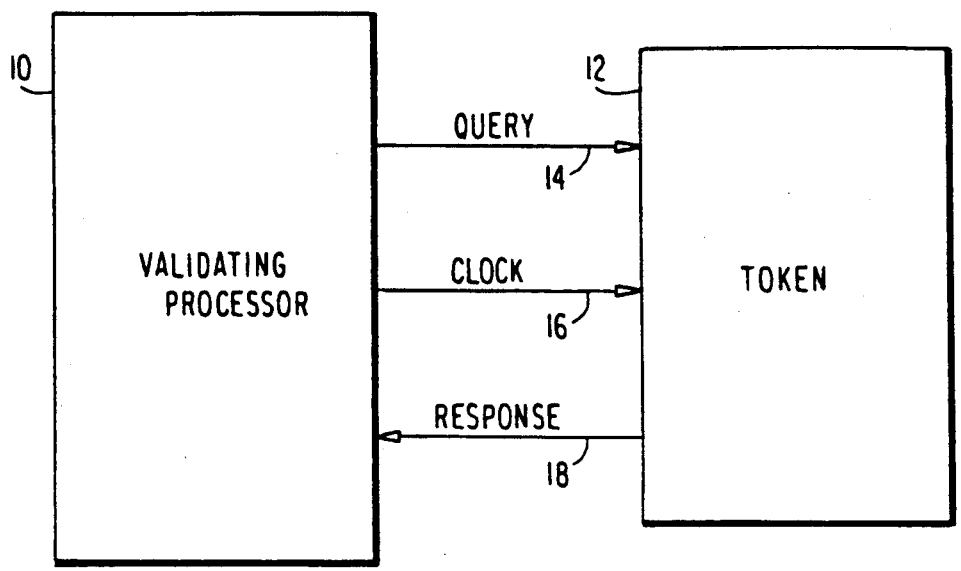
FIG. 1 is a high level block diagram showing the token and the validating processor.
Figure 2A:
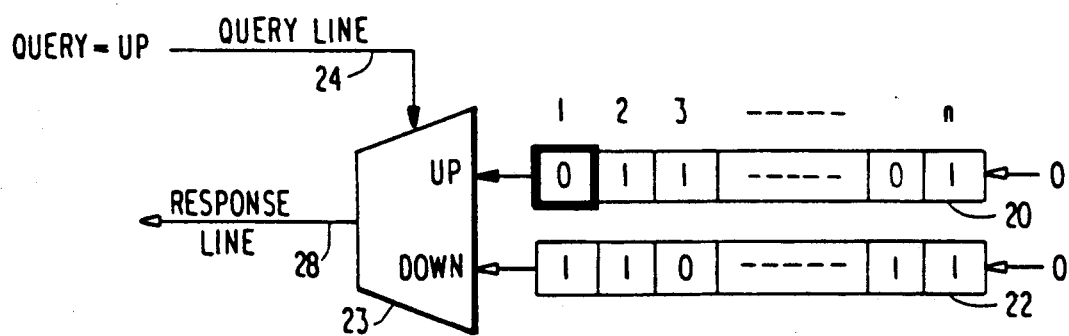
FIGS. 2A and 2B are simplified block diagrams showing both the architecture and operation of shift register based battery powered tokens.
Figure 2B:
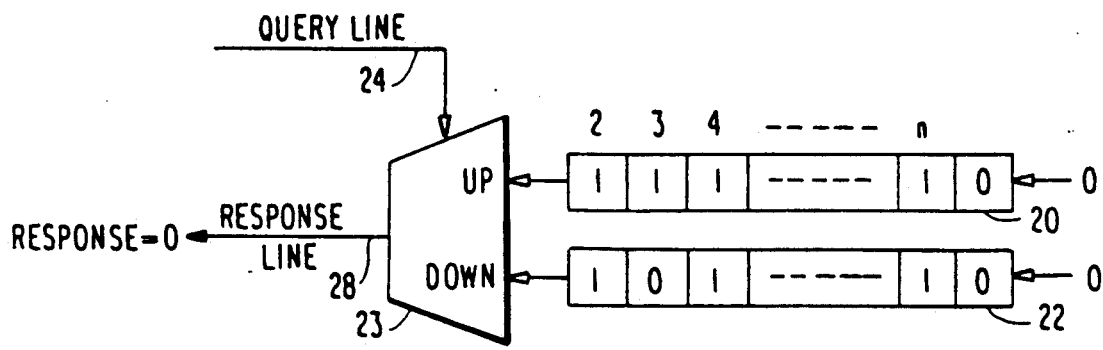

The write-once-read-once batteryless authentication token according to the present invention will be described in terms of fuse link technology. It will be understood, however, that with newer technology, the fuse link memory cells can be replaced with electrically erasable memory cells. It will also be understood that this description assumes implementation of the device as a single integrated circuit and that this implementation confers a measure of physical security to the device in that this method of implementation renders the job of electronically probing the circuit exceedingly difficult.

The creation of a fuse is a common technology as used in programmable array logic (PAL) devices which are mostly fuse link devices. The fuse that is made can only handle a certain amount of current for a length of time after which the fuse becomes a very high resistance link, which in this circuit causes a different logic level to be detected. This property is used to destroy the programmed data in the token.

Referring now to the drawings, and more particularly to FIG. 3, there is shown a preferred embodiment of the write-once-read-once token according to the invention using fuse link technology. The token comprises n and m arrays, 30 and 40, respectively, each of 128 bits in the preferred embodiment, but there could be either more or less bits depending on the application and protocol. Each stage of the arrays 30 and 40 is comprised of an NPN bipolar transistor 32, 42, etc., connected as a collector follower with a fuse 34, 44, etc., in each emitter circuit. Data are taken from the common collectors of the transistors at output terminals 36 and 46, respectively.

The base circuits of the transistors are addressed by demultiplexers 38 and 48, respectively, each of which have 128 select output lines numbered 0 to 127. Serial data to the demultiplexers 38 and 48 are supplied from NAND gates 50 and 52, respectively, which receive data from flip-flops 54 and 56, respectively, which are clocked by the token clock at input terminal 58. The n and m arrays, 30 and 40, only receive token data during the write cycle which consists of 128 token clock cycles. After the write cycle, the device can only be read destructively for 128 clock cycles. All fuses not already blown by the write cycle are blown by this read cycle so that after the read cycle any attempt to read the device will show uniform "ones" regardless of the device's prior content.

The token clock is also input to a 256 count counter 60 which provides seven lines of binary count data to the demultiplexers 38 and 48. It should be noted that this counter is of a kind which is set to zero by power on. This data is used to address each of the transistors in the respective n and m arrays 30 and 40. As data is written into each of the arrays during the write cycle, the fuses which are to be programmed to a logical one are blown by the current conducted by their corresponding transistor, while those to be programmed to a logical zero will be left in tact.

At the point that the token has been written, the count in counter 60 is at decimal 127. To assure that the token can not be written again, the counter 60 will be clocked once more, resetting the least significant seven bits (LSBs) to all zeros and setting the most significant bit (MSB) to a logical one. This operation would initiate the read operation, but the duration of this operation under power is very short. The most significant bit (MSB) position 60 is connected to a pair of transistors 61 connected as a modified Darlington pair. The emitter of the second transistor $Q_2$ is fused, and when the MSB goes to one, transistor $Q_1$ drives a large current into the base of transistor $Q_2$, thus causing a large current to pass through the emitter fuse on transistor $Q_2$ quickly destroying it. Once this fuse is blown, power must be removed immediately so the read cycle will not be initiated. The blown fuse causes logical one levels to be supplied to the inputs of NAND gates 50 and 52, thereby inhibiting further clocked inputs to the demultiplexers 38 and 48. As a result, the token cannot be written again. The next power up will initiate the read operation.

During the read operation, the n and m data placed on lines 36 and 46. This data is supplied via respective inverters 66 and 68 to the clock inputs of latches 70 and 72, the data inputs of which are grounded corresponding to logical zero. The inverters provide a 10 to 20 nanosecond (ns) delay. The token clock is also supplied to inverting inputs of NAND gates 74 and 76. The other inputs to these NAND gates are, respectively, the n and m data bits from lines 36 and 46. The NAND gates 74 and 76 also provide a 10 to 20 ns delay, and their outputs are connected to preset inputs of the latches 70 and 72, respectively.

First and second AND gates 78 and 80 each receive as inputs the n and m data bits from input lines 36 and 46 and the token clock input from input terminal 58. The outputs of these AND gates are connected to the clock inputs of respective flip-flops 82 and 84. The data inputs to these flip-flops are supplied respectively by latches 70 and 72. The latched data n and m, from flip-flops 82 and 84, respectively, are supplied to inputs of a multiplexer 86. The multiplexer 86 is connected to the collector of transistor $Q_2$ so that, when the fuse in the emitter circuit of $Q_2$ is blown, the multiplexer is permitted to have output. This allows token response activity only during the read cycle. The token response from the multiplexer 86 is either latched data n, from flip-flop 82, or latched data m, from flip-flop 84, which is selected by a clocked token query, from flip-flop 90. The query itself is supplied on input terminal 88 to the data input of flip-flop 90 which is clocked by the token clock via an inverter 92.

Figure 4:
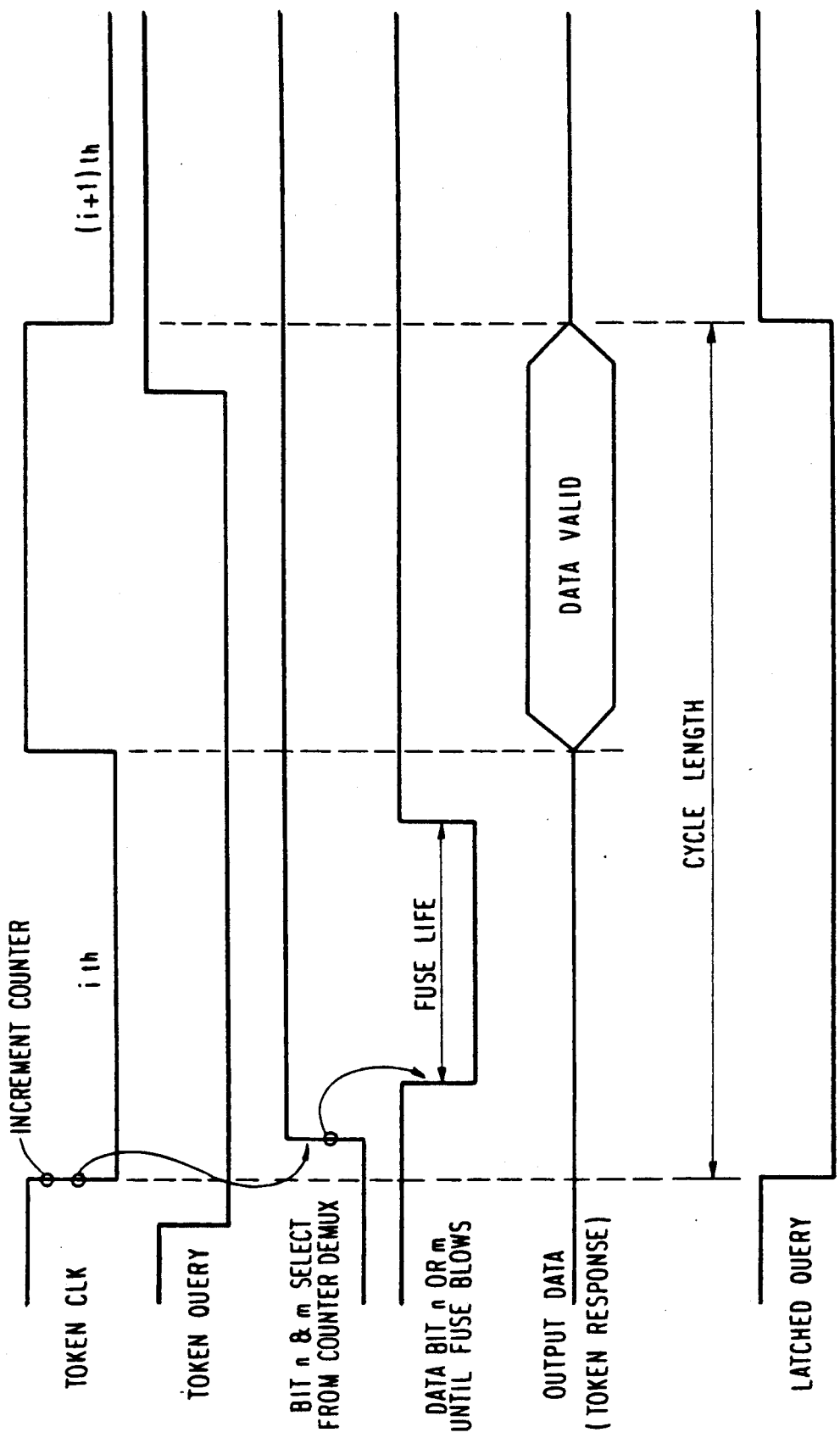
FIG. 4 is a timing diagram illustrating the operation of the embodiment shown in FIG. 3.

The timing diagram in FIG. 4 depicts how a fuse link ($n_i$ or $m_i$) yields valid data for a known amount of time during the ith token clock of a read cycle. On the falling edge of the ith token clock, the internal counter is incremented to i. This causes bits $n_i$ and $m_i$ from the arrays to be selected. Upon this selection, a high level (logical one) is sent to each of the $n_i$ and $m_i$ memory cells regardless of the status of their fuses. For an intact fuse, the n data line 36 or m data line 42 will go low (logical zero) for a period of time until fuse destruction eventually causes the data line to go high again. This defines the fuse life and it is required to be less than half of the clock period at a fifty percent duty cycle.

Once the fuse has been burned, the data will then be available to a reading device. The latch circuit of FIG. 3 begins operation when a bit is selected. Considering latch circuit n, the first latch 70 defaults to the preset state indicating that the data bit is a one which may or may not indicate a valid bit. If the fuse is blown, the first latch will retain the one, and a one will be clocked to the multiplexer 86 on the rising edge of the token clock if both n and m bits are logical ones. If the fuse is not blown, the bit cell will go to a low level (logical zero) for the fuse life. The bit transition from a one to a zero will clock the first latch 70 in the latch circuit which will latch a zero until the output flip-flop 82 can receive it. As a check, the output latch 82 will not clock out the data if both the n and m bit fuses have not been blown. It is critical that the transfer delay of AND gate 78 be small compared to the transfer delay of NAND gate 74 to assure that data clocked by latch 82 is valid. Once both of the fuses have been blown, the data will be latched out to the output multiplexer 86 on the rising edge of the token clock. This requires that the token clock must be low for a period of time longer than the longest fuse life as shown in FIG. 4.

This latch circuit operation is the same for latch 72 and output flip-flop 84. The token response becomes valid on the rising edge of the token clock and the data from either bank is selected by the token query line state latched on the falling edge of the token clock. The token response is then valid for the period of time while the token clock is high. When the token clock goes low again, the next read cycle will begin with the selection of another bit in the array with a new token query.

This token is a write-once and a read-once device, and the input circuit controls the writing and the reading of the device. This token design first has a write cycle, then a read cycle. When writing the device, an on-board counter that counts from 0 to 256 where the most significant bit controls the demultiplexing of the memory bits to be programmed and read back. After completing the write cycle, the MSB will be set to one on the counter and will cause a separate fuse to be burned that will internally indicate that the device has been programmed. During the write operation, the information contained on the data zero and data one input terminals will be routed to the memory cells so that the fuses can be blown to program the token. Once the write operation completes, the MSB output to transistors $Q_1$ and $Q_2$ will cause them to burn a fuse which will inhibit input data access to the memory cells and provide a high signal to the memory cells when accessed so that the cell fuse will be blown on the read access. Also during the write operation, the output of the token is disabled. It becomes enabled once the writing process has been completed.

The intent of this token design is to provide a batteryless token that will essentially provide an unlimited token shelf life, lower the cost of the token, and make the token less susceptible to accidental clocking. This is done by using controlled timing of fuse destruction and protective latching of output data to ensure the destruction of unselected data to avoid its exposure. The invention may be readily implemented as an integrated circuit.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A write-once-read-once token security system for allowing limited access to a secure system comprising:
   a token comprising an array of fuse links;
   means for writing data into said array by blowing selected ones of said fuse links; and
   means for reading data out of said array, said means for reading data in addition blowing fuse links in said array not already blown by said means for writing data.

2. The token security system recited in claim 1 wherein said array of fuse links is composed of first and second arrays of fuse links, said token further comprising multiplexer means connected to said first and second arrays and responsive to said means for reading data for selectively reading data from one or the other of said first and second arrays.

3. The token security system recited in claim 1 wherein said means for writing comprises:
   data latch means for temporarily storing data to be read into said array;
   demultiplexer means for addressing individual fuse links in said array; and
   counter means connected to said demultiplexer means for cycling through addresses for each of said fuse links, said demultiplexer means connecting said data latch means to an addressed fuse link.

4. The token security system recited in claim 3 wherein said counter means counts 2n addresses, where n is the number of fuse links in said array, said token security system further comprising inhibiting means responsive to an nth address output of said counter means to inhibit the connection of said data latch means to an addressed fuse link, said means for reading further clocking said counter to read data out of said array.

5. The token security system recited in claim 1 wherein said array of fuse links is composed of first and second arrays of fuse links, said token further comprising multiplexer means connected to said first and second arrays and responsive to said means for reading data for selectively reading data from one or the other of said first and second arrays and wherein said means for writing comprises:
   first and second data latch means for temporarily storing data to be respectively read into said first and second arrays;
   first and second demultiplexer means for respectively addressing individual fuse links in said first and second arrays; and
   counter means connected to said first and second demultiplexer means for cycling through addresses for each of said fuse links, said first and second demultiplexer means respectively connecting said first and second data latch means to an addressed fuse link in said first and second arrays.

6. The token security system recited in claim 5 wherein said counter means counts 2n addresses, where n is the number of fuse links in each of said first and second arrays, said token security system further comprising inhibiting means responsive to an nth address output of said counter means to inhibit the connection of said first and second data latch means to an addressed fuse link, said means for reading further clocking said counter means to read data out of said first and second arrays.

7. The token security system recited in claim 6 further comprising third and fourth latch means respectively connected between said first and second arrays and said multiplexer means for temporarily storing data read out of said first and second arrays.

8. A write-once-read-once token for authorizing access to a secure system comprising:
first and second arrays of fuse links;
multiplexer means connected to said first and second arrays for selectively reading data from one or the other of said first and second arrays:
first and second data latch means for temporarily storing data to be respectively read into said first and second arrays; respectively addressing individual fuse links in said first and second arrays; and
counter means connected to said first and second demultiplexer means for cycling through addresses for each of said fuse links, said first and second demultiplexer means respectively connecting said first and second data latch means to an addressed fuse link in said first and second arrays.

9. The token recited in claim 8 wherein said counter means counts 2n addresses, where n is the number of fuse links in each of said first and second arrays, said token security system further comprising inhibiting means responsive to an nth address output of said counter means to inhibit the connection of said first and second data latch means to an addressed fuse link, said counter means being further clocked to read data out of said first and second arrays.

10. The token security system recited in claim 9 further comprising third and fourth latch means respectively connected between said first and second arrays and said multiplexer means for temporarily storing data read out of said first and second arrays.

11. A physically secure forgery-resistant authorization system comprising:
an output device;
a token including storage means including at least first and second distinct storage elements for electronically storing information and for coupling signals representative of a selected portion of said stored information to said output device, said storage means requiring no sustaining power when not in use;
a connector for coupling said token to said output device, said connector including a query input terminal, token clock input terminal, and an output response terminal;
means for connecting said query input terminal to said token;
said token including selection means responsive to signals on said query input terminal for selecting and coupling to said connector signals from either said first or second distinct storage elements, said token further including means, simultaneous with said coupling, for destroying unselected information, whereby after selected information is output neither said first nor said second distinct storage elements retain said unselected stored information.

12. A physically secure authorization device as recited in claim 11 wherein said first and second distinct storage elements comprise first and second memory arrays and means connecting said query terminal and said clock terminal to said memory arrays for selecting elements of said memory arrays, whereby after a number of clock pulses have been received equal in number to twice the capacity of said first and second memory arrays, both said first and second memory arrays will no longer retain said stored information.

13. A physically secure authorization device as recited in claim 12 wherein said selection means comprises addressing means responsive to clock pulses on said clock terminal for addressing both of said first and second memory arrays.

14. A physically secure authorization device as recited in claim 13 wherein said selection means also includes multiplexer means responsive to a query signal on said query input terminal for selecting an addressed output from one of said first or second memory arrays, said selected output being supplied on said output response terminal.

15. A physically secure authorization device as recited in claim 12 in which said selection means comprises:
counter means responsive to clock pulses on said clock terminal for generating addresses;
first and second demultiplexer means responsive to said addresses for reading out data bits from said first and second memory arrays, respectively; and
multiplexer means responsive to a query signal on said query input terminal for selecting an addressed output from one of said first or second memory arrays, said selected output being supplied on said output response terminal.

16. A physically secure authorization device as recited in claim 11 in which said storage means and said output device are implemented as an integrated circuit.

17. A physically secure authorization device as recited in claim 11 in which said storage means and said output device are enclosed within a tamper resistant package.

18. A physically secure authorization device as recited in claim 11 in which said storage means comprises a memory array wherein said first and second distinct storage elements comprise different addressable storage locations, and wherein said selection means includes counter means with an input coupled to said token clock input of said connector for addressing said memory array.

19. A physically secure authorization device as recited in claim 18 in which said connector further includes at least a data input terminal coupled to at least one input of said distinct storage elements.

20. A physically secure authorization device as recited in claim 18 in which said memory arrays store bits in the physical state of an electronic component.

21. A physically secure authorization device as recited in claim 20 where said electronic component is a fusible link device.

22. A physically secure authorization device as recited in claim 11 in which said connector further includes at least a data input terminal coupled to at least one input of said distinct storage elements.

23. A physically secure forgery-resistant authorization device comprising:
storage means for retaining stored information;

a connector with an output terminal and a query input;

first means responsive to query information represented by said query input for selecting and coupling to said output terminal signals representative of a selected portion of said stored information only after destroying both the selected permanently stored information and an equal quantity of unselected stored information, whereby before said selected information is output via said connector, said device no longer retains said equal quantity of said unselected stored information.

24. A physically secure authorization device as recited in claim 23 wherein said first means further includes means for destroying said selected stored information so that before said selected stored information is output from said output terminal, said device no longer retains in a permanent form either said selected or said unselected stored information.

25. A physically secure authorization device as recited in claim 23 wherein said connector further includes a clock terminal and said storage means comprise memory arrays, said first means comprises:

address means connected to said clock terminal for generating addresses of data stored in said memory arrays; and selector means for selecting addressed data in said memory arrays for coupling to said output terminal.

26. A physically secure authorization device as recited in claim 25 in which said selector means includes latch means for temporarily storing said selected addressed data.

* * * * *